(12) United States Patent
Simard et al.

(10) Patent No.: US 7,634,137 B2
(45) Date of Patent: Dec. 15, 2009

(54) UNFOLDED CONVOLUTION FOR FAST FEATURE EXTRACTION

(75) Inventors: Patrice Y. Simard, Bellevue, WA (US); David W. Steinkraus, Santa Fe, NM (US); Kumar H. Chellapilla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 11/250,819

(22) Filed: Oct. 14, 2005

(65) Prior Publication Data

US 2007/0086655 A1    Apr. 19, 2007

(51) Int. Cl.
*G06K 9/46* (2006.01)
(52) U.S. Cl. ............... 382/190; 382/279; 382/132; 382/128
(58) Field of Classification Search ............ 382/190, 382/279, 132, 128
See application file for complete search history.

(56) References Cited

U.S. PATENT DOCUMENTS 5,577,135 A * 11/1996 Grajski et al. ............ 382/253
6,408,107 B1 * 6/2002 Miller et al. ............. 382/294
6,483,940 B1 * 11/2002 Wang ..................... 382/164
6,608,929 B1 * 8/2003 Shiratani ................. 382/173
6,947,502 B2 * 9/2005 Taylor et al. ............. 375/340
7,231,080 B2 * 6/2007 Hakim et al. ............ 382/149

OTHER PUBLICATIONS

Patrice Y.Simard, Leon Bottou, Patrick Haffner, Yann Le Cun, Boxlets: a fast convolution Algorithm for Signal processing and Neural Networks(pdf), In Advance in Neural Information Processings Systems, Kearns, M., Solla, S., Cohn, D. (Eds.), vol. 11, MIT Press, pp. 571-577, 11999.*

* cited by examiner

*Primary Examiner*—Samir A. Ahmed
*Assistant Examiner*—Aklilu k Woldemariam
(74) *Attorney, Agent, or Firm*—Lee & Hayes, PLLC

(57) ABSTRACT

Systems and methods are described that facilitate performing feature extraction across multiple received input features to reduce computational overhead associated with feature processing related to, for instance, optical character recognition. Input feature information can be unfolded and concatenated to generate an aggregated input matrix, which can be convolved with a kernel matrix to produce output feature information for multiple output features concurrently.

13 Claims, 12 Drawing Sheets

*I*: Input (matrices) * *K*: Kernels (matrices) = *O*: Output (matrices)

FIG. 1

UNFOLDED CONVOLUTION FOR FAST FEATURE EXTRACTION

BACKGROUND

Computers have become an integral part of society. Every day people become more dependent on computers to facilitate both work and leisure activities. A significant drawback to computing technology is its "digital" nature as compared to the "analog" world in which it functions. Computers operate in a digital domain that requires discrete states to be identified in order for information to be processed. In simple terms, information generally must be input into a computing system with a series of "on" and "off" states (e.g., binary code). However, humans live in a distinctly analog world where occurrences are never completely black or white, but always seem to be in between shades of gray. Thus, a central distinction between digital and analog is that digital requires discrete states that are disjunct over time (e.g., distinct levels) while analog is continuous over time. As humans naturally operate in an analog fashion, computing technology has evolved to alleviate difficulties associated with interfacing humans to computers (e.g., digital computing interfaces) caused by the aforementioned temporal distinctions.

Handwriting, speech, and object recognition technologies have progressed dramatically in recent times, thereby enhancing effectiveness of digital computing interface(s). Such progression in interfacing technology enables a computer user to easily express oneself and/or input information into a system. As handwriting and speech are fundamental to a civilized society, these skills are generally learned by a majority of people as a societal communication requirement, established long before the advent of computers. Thus, no additional learning curve for a user is required to implement these methods for computing system interaction.

Effective handwriting, speech, and/or object recognition systems can be utilized in a variety of business and personal contexts to facilitate efficient communication between two or more individuals. For example, an individual at a conference can hand-write notes regarding information of interest, and thereafter quickly create a digital copy of such notes (e.g., scan the notes, photograph the notes with a digital camera, . . . ). A recognition system can be employed to recognize individual characters and/or words, and convert such handwritten notes to a document editable in a word processor. The document can thereafter be emailed to a second person at a distant location. Such a system can mitigate delays in exchanging and/or processing data, such as difficulty in reading an individual's handwriting, waiting for mail service, typing notes into a word processor, etc.

Conventional handwriting, speech, and/or object recognition systems and/or methodologies typically utilize one or more programs that are customized for particular actions and/or applications. For example, a customized program for determining identification of a particular character could employ a plurality of functions that search for particular features in order to identify such character. A program that identifies a "d" can first determine that a line of particular height exists, and thereafter determine that a single loop left of the line is present to facilitate identifying the "d". While such customized programs have improved over time, empirical data suggests that statistical systems and/or methods outperform such customized programs.

Previously, statistical methods have not been employed in handwriting, speech, and/or object recognition systems due to limits in processing speed, bandwidth, and storage area, as effective statistical systems and/or methods utilized to recognize handwriting, speech, and/or objects require a substantial amount of labeled data to train a learning algorithm. As advances in technology have alleviated concerns regarding computing limits, an increase in popularity of statistical systems and/or methods has occurred. However, collecting labeled data utilized to train a learning algorithm employed in statistical recognition systems and/or methods remains a tedious and expensive task. For example, several instances of a same character must be collected and labeled as such character in order to effectively train a learning algorithm.

In view of at least the above, there exists a strong need in the art for a system and/or methodology that facilitates increasing learning speed and/or throughput with regard to character recognition.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate feature extraction on various kinds of signals, which can be done through a succession of convolutions. For example, in optical character recognition (OCR) systems, a convolutional neural network can apply a succession of convolutions to extract features in order to perform high-level classification. Often the implementation of the convolution is not well suited for fast execution on modem computers. Various aspects described herein address this problem by reorganizing the input (e.g., with redundant copies) to the convolution in a manner that is much more regular and better suited for modem CPUs. The CPU can then take advantage of special parallel hardware (SSE or MMX) to speed up convolution substantially. Such aspects can provide over three-fold increases in end-to-end speed in training OCR systems, with equivalent accuracy. Improved training speed allows for faster innovation and reduced product-to-market time. Traditional systems for training an OCR can take weeks, for each language. A deployment version of the OCR also can be sped up by the systems and/or methods presented herein, which permits faster response time for a user and lower minimum system requirements (e.g., for the CPU).

In accordance with one aspect of the claimed subject matter, systems are described that comprise a convolution component, such as a convolutional neural network, that can receive multiple inputs and can generate an input matrix comprising unfolded input feature information. The input matrix can thus be rewritten in a manner such that each row thereof comprises all input feature values required for generation of one element of an output feature. The input matrix can then be multiplied by a kernel matrix, wherein each column of the kernel matrix is mapped to an output feature, to generate a matrix product that can be employed for character recognition and the like. Such rearrangement of input information can facilitate reducing computational overhead and increasing processing speed.

In accordance with another aspect of the claimed subject matter, a method of performing feature extraction across multiple input features for convolution in a neural network can comprise receiving multiple input features and unfolding such features to generate an unfolded input feature matrix.

Additionally, input features can be concatenated to reduce matrix size while preserving essential input feature information. The input feature matrix can then be convolved with a kernel matrix to generate a plurality of output features, which in turn can be arranged in a 2D matrix to approximate the received input. The 2D matrix can then be utilized to facilitate, for instance, optical character recognition, classifier training, and the like.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 1 illustrates a general computational solution that can be performed to address a general computational problem according to various aspects described herein.

DETAILED DESCRIPTION

Figure 2:
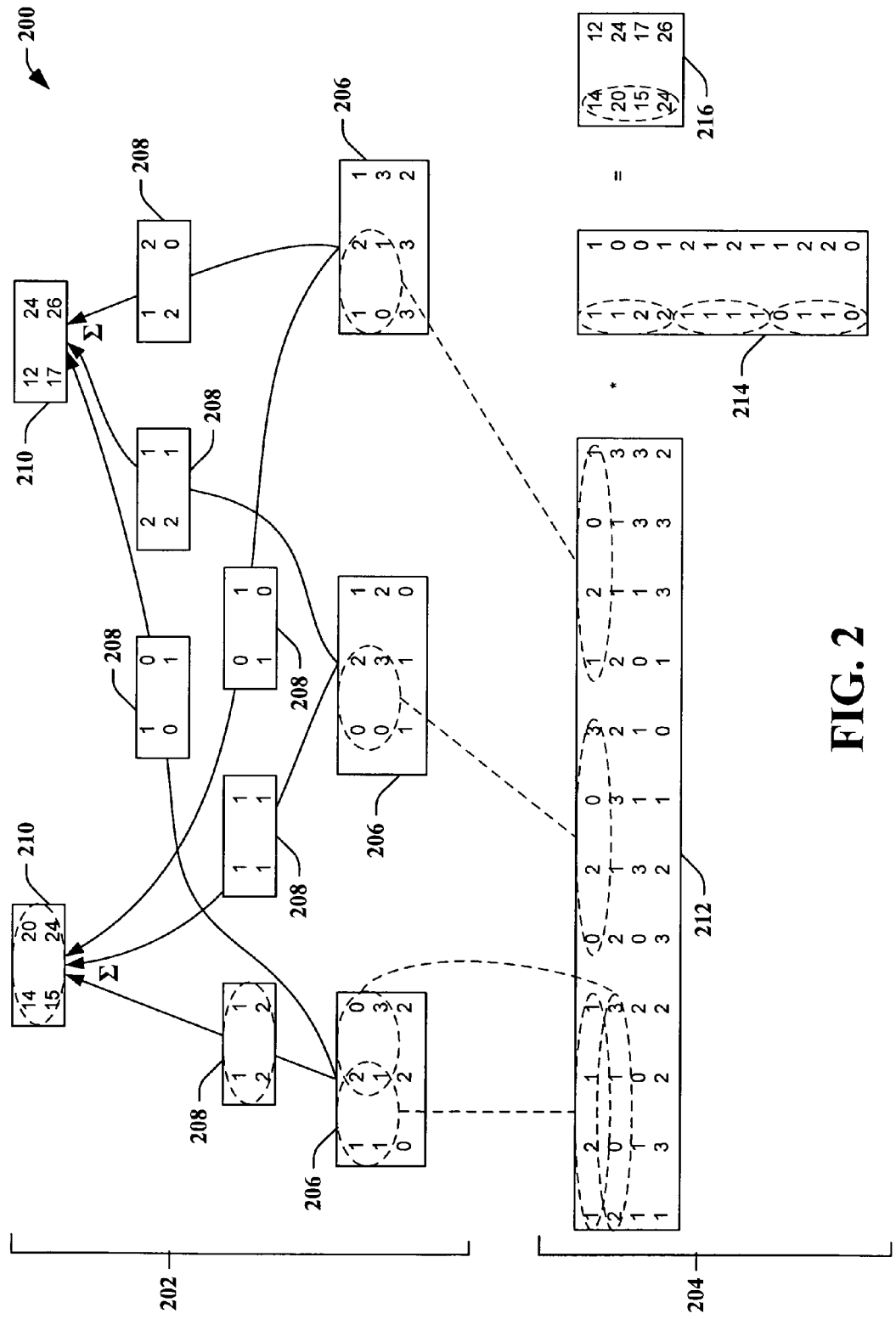
FIG. 2 illustrates a system that facilitates unfolding a matrix structure to optimize data ordering and performing a convolution technique on such unfolded features, in accordance with one or more aspects.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Figure 1:
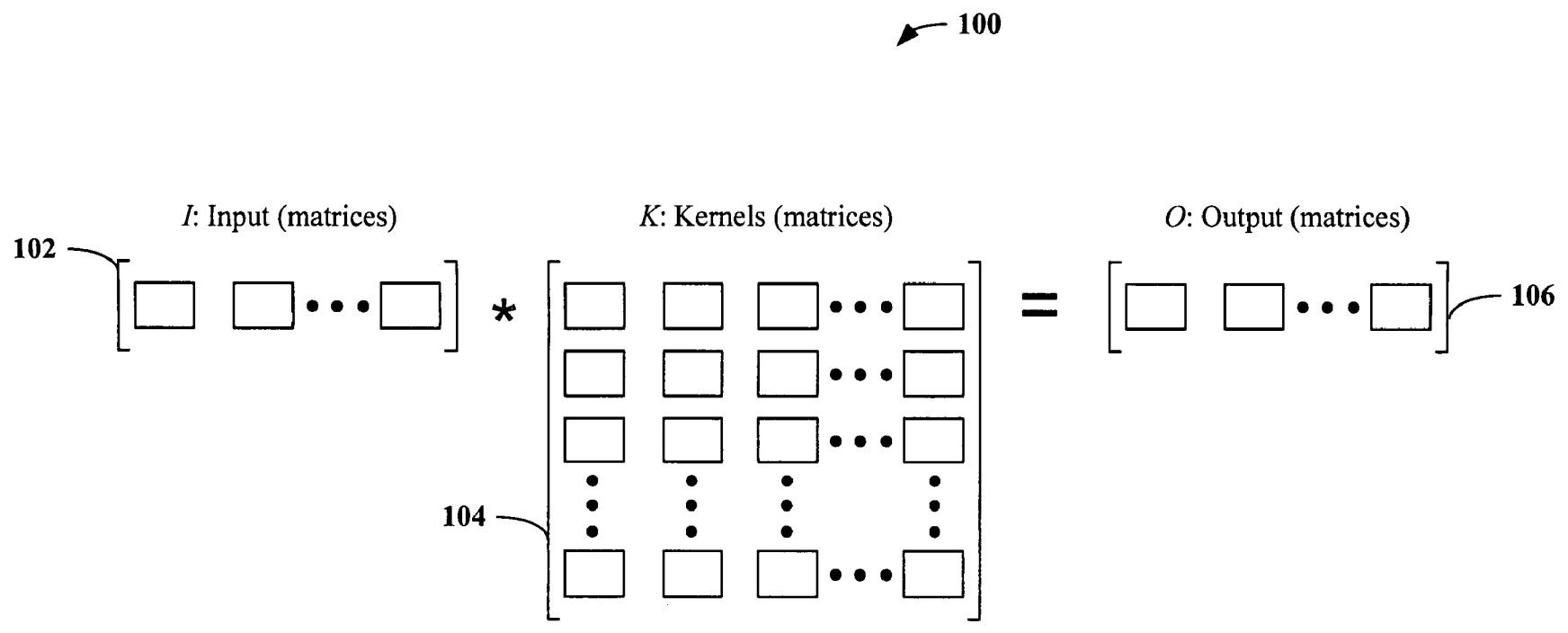

FIG. 1 illustrates a general computational solution 100 that can be employed according to various aspects described herein. The solution is presented as computing a vector-matrix product between an input vector 102 and a kernel matrix 104 to obtain an output vector 106, under a special algebra, wherein the input 102 is a vector of matrices (e.g., of possibly different sizes), the kernel 104 is a matrix of matrices (e.g., of possibly different sizes), and the output 106 is a vector of matrices (e.g., of possibly different sizes). The described problem definition can include related problem cases such as the associated matrix-vector (e.g., as opposed to vector-matrix) problem obtained by taking matrix transposes on both sides of the equation. The output matrices 106 can be computed as follows: the j-th output is computed as the inner product between the input vector 102 and the j-th column of the kernel matrix 104 under the special algebra. As shown in equation (1), below, the j-th output is a sum of the functions of element-wise convolutions of the input matrices 102 and the j-th column kernel matrices 104.

$$O^j = \sum_i f(I^i * K^{ij}) = \sum_i f(conv(I^i, K^{ij})) \quad (1)$$

It will be appreciated that examples of function (ƒ) for equation (1) can include, without being limited to, matrix operations such as sub-sampling and the like. The output computation puts certain constraints on the possible sizes of the input matrices 102, the kernel matrices 104, and the output matrices 106. For instance, as matrix-sum is defined only for matrices of the same size, the result of $f(conv(I^i, K^{ij}))$ can be of the same size for all i. From the foregoing, the size of $O^j$ can be equal to the size of $f(conv(I^i, K^{ij}))$. It will be appreciated that the above illustrates one aspect of a described solution. The general definition also includes related cases, such as the associated matrix-vector (as opposed to a vector-matrix) solution obtained by taking matrix transposes on both sides of the equation, the associated matrix-vector solution obtained by re-arranging the columns and rows of the kernel matrix, etc.

FIG. 2 illustrates a system 200 that facilitates unfolding a matrix structure to optimize data ordering and performing a convolution technique on such unfolded features, in accordance with one or more aspects. The figure illustrates both a conventional convolution model 202 and an improved matrix product convolution model 204 that employs the special algebra set forth above with regard to FIG. 1, in order to provide an understanding of the differences there between. Neural networks can be utilized for feature extraction in, for instance, handwriting recognition applications, image warping applications, optical character recognition applications, and the like. Convolutional neural networks can improve the accuracy of feature extraction by providing an association between signal data and locality of a feature. However, such convolutional neural networks can be computationally expensive when compared to standard neural networks. The matrix product convolution model 204 can facilitate mitigating computational overhead associated with a convolutional neural network by unfolding and concatenating input features in order to aggregate input signal data into a larger matrix, which is computationally far less expensive than processing a larger number of smaller matrices.

According to one or more aspects, convolution of multiple features 206 can be performed to produce new features, such as can be performed by a convolution neural network. The matrix product convolution model 204 can be distinguished from the traditional convolution model 202 by several aspects. For example, the matrix product model 204 can convolve features 206 by performing a dot product of an input feature matrix 212 with a kernel matrix 214 to each position, without inverting columns and rows. In contrast, the traditional convolution model 202 convolves with, for instance, an inverted matrix [[2 2 ][1 1]], rather than [[1 1 ][2 2]]. Additionally, the matrix product model 204 can return a result only for those parts that are computed without zero-padded edges.

Table 1 is presented below to facilitate understanding of matrix product convolution 204.

TABLE 1

$$\begin{bmatrix} 1 & 2 & 0 \\ 1 & 1 & 3 \\ 0 & 2 & 2 \end{bmatrix} * \begin{bmatrix} 2 & 2 \\ 1 & 1 \end{bmatrix} = \begin{bmatrix} 2 & 6 & 4 & 0 \\ 3 & 7 & 10 & 6 \\ 1 & 6 & 12 & 7 \\ 0 & 2 & 4 & 2 \end{bmatrix}$$

$$+$$

$$\begin{bmatrix} 0 & 2 & 1 \\ 0 & 3 & 2 \\ 1 & 1 & 0 \end{bmatrix} * \begin{bmatrix} 1 & 1 \\ 1 & 1 \end{bmatrix} = \begin{bmatrix} 0 & 2 & 3 & 1 \\ 0 & 5 & 8 & 3 \\ 1 & 5 & 6 & 2 \\ 1 & 2 & 1 & 0 \end{bmatrix}$$

$$+$$

$$\begin{bmatrix} 1 & 2 & 1 \\ 0 & 1 & 3 \\ 3 & 3 & 2 \end{bmatrix} * \begin{bmatrix} 0 & 1 \\ 1 & 0 \end{bmatrix} = \begin{bmatrix} 0 & 1 & 2 & 1 \\ 1 & 2 & 2 & 3 \\ 0 & 4 & 6 & 2 \\ 3 & 3 & 2 & 0 \end{bmatrix}$$

$$\begin{bmatrix} 14 & 20 \\ 15 & 24 \end{bmatrix}$$

Three features (3×3 matrices) are shown in Table 1, each of which undergoes a convolution operation with a weighted kernel (2×2 matrices). The results of all convolutions can then be added together. In this example, there are three convolution results (one 4×4 matrix for each input feature), which are summed to form a final output matrix.

Returning now to FIG. 2, convolution kernels 208 are equal in number to the product of the number of input features 206 and the number of output features 210, which, according to this example, is six. However, it will be appreciated that more or fewer convolution kernels can be utilized in accordance with various aspects. In the case of convolutional neural networks, the input can be an image of a character, and the convolutional kernels can be trainable parameters (e.g., 5 by 5 array of floating point values, . . . ). By extracting and combining features, the neural network can recognize characters automatically after training. Many variations can be performed on the manner in which the convolutions are implemented: for example, subsampling, kernels of various sizes, padding, complex combinations of convolution, etc. However, traditional convolution architectures are irregular and ill suited for computers that access memory linearly.

In order to improve compatibility with linear memory access protocols and to reduce processing overhead, the matrix product model 204 can "unfold" the input features 206, in order to regularize memory access. As a result, several inputs can be duplicated multiple times. However, when there are multiple output features, the overhead of input duplication is negligible because the advantages associated with input duplication are shared by each output feature. Additionally, in the event that unfolding input features does not increase processing speed due to, for instance an initial access for unfolding that is as irregular and/or expensive as accessing the input for a single convolution, two aspects of the matrix product model 204 can be implemented. First, multiple input features can be concatenated during unfolding, in addition to the unfolding procedure itself. Second, multiple output features can facilitate dividing the cost of unfolding across the output features, which results in a significant increase in speed of the convolutions of input features.

Still referring to FIG. 2, there are three input features 206 and two output features 210 illustrated. Thus, there are six convolutional kernels 208, one for each pair of input-output features. A summation sign (Σ) is shown near the inputs of the three convolutional kernels 208 to respective output features 210 to illustrate that the dot products of the matrices are summed to obtain the output matrices 210. If these were implemented as single 2D convolutions as is conventional, there would be a substantial amount of overhead since the longest loop is in only three units long, and most likely the shortest loop will have a length of two units. In contrast to such traditional approaches, the matrix product model 204 can rewrite the input features 206 as illustrated in the larger matrix of input features 212. The input for each convolution can be rewritten such that each row contains all the input values necessary to compute one element of an output feature. This can imply duplication of some input, since for instance, the center of each 3 by 3 input feature 206 is used four times to compute each element of an output feature matrix 216. However, the process of copying the input value need only be performed once, regardless of the number of output features in matrix 216. This means that if there are, for example, 50 output features, the cost of copying will be negligible compared to the cost of computing all the output features. If there are multiple input features, and if the results of the convolutions are summed across input features, the input features can be concatenated into one long row of the input matrix 212.

A kernel matrix 214 can be rewritten accordingly by concatenating into columns the kernels associated with respective output features. Each output feature then corresponds to a column in the new kernel matrix 214. When the new input matrix 212 is multiplied by the kernel matrix 214, the output features are computed automatically. Output features can then be rearranged into 2D matrices to be equivalent to the original 2D layout. Moreover, the cost of rearranging the output features can be divided across the numerous input features. Thus, the convolution is a product of two rectangular matrices, and the inner loop is of length 12, rather than two, according to this example. This results in a substantial computational speed increase, which can be further augmented by using specialized hardware instructions (e.g., SSE or MMX, such as can be found on modern processors, and the like), as such specialized hardware instructions exhibit increased regularity with regard to memory accesses.

Figure 3:
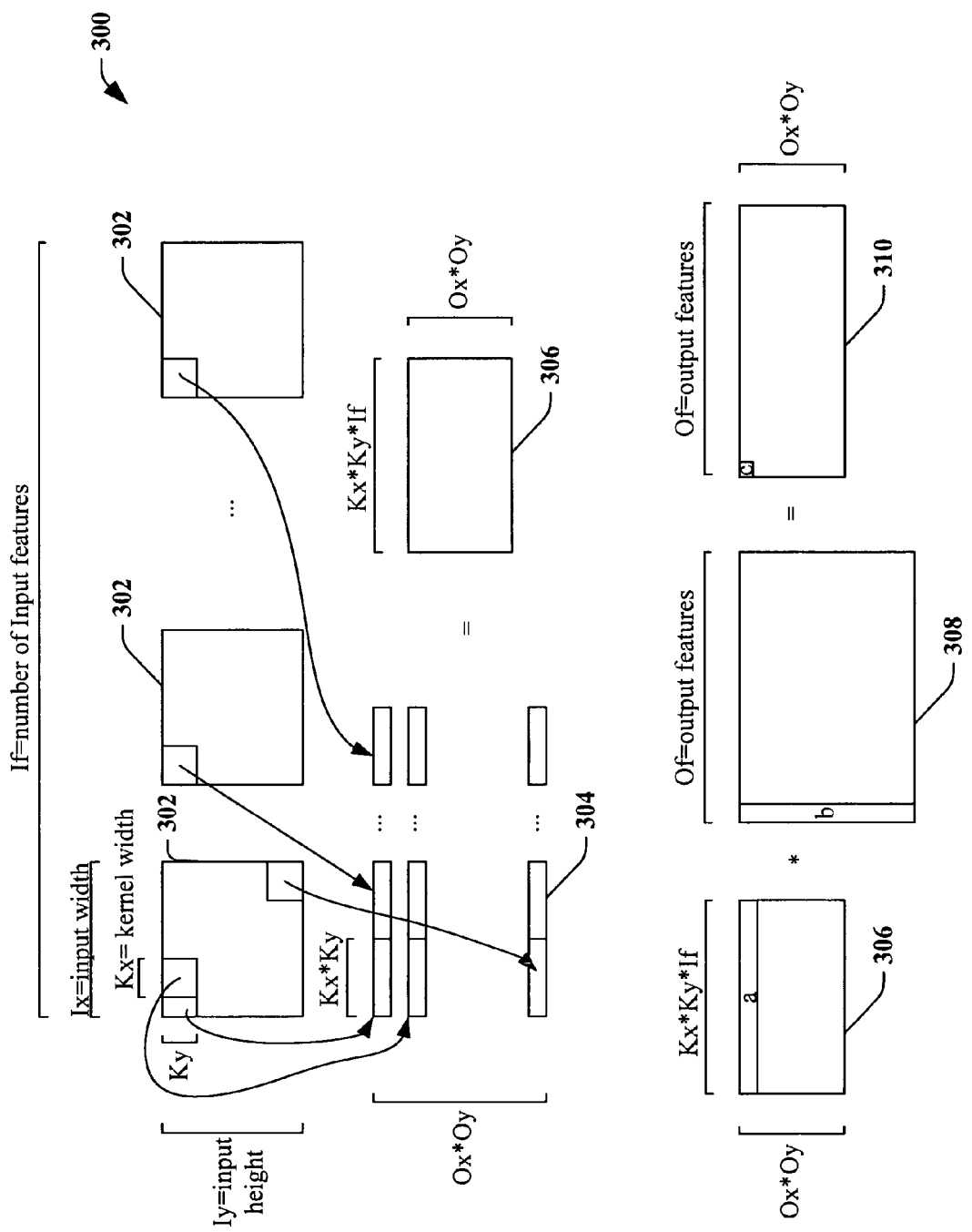
FIG. 3 is an illustration of an unfolding model that facilitates an understanding of matrix size relationships with regard to input matrix sizes, kernel matrix sizes the effects of subsampling, and the like, in accordance with various aspects.

FIG. 3 is an illustration of an unfolding model 300 that facilitates an understanding of matrix size relationships with regard to input matrix sizes, kernel matrix sizes the effects of subsampling, and the like, in accordance with various aspects. A plurality of input features 302, enumerated as $I_f$, can be unfolded and weighted to generate linearized weights 304, or kernels, gleaned from the input features. Input features can have a height, $I_y$, and a width, $I_x$, while kernels can heave a height, $K_y$, and a width, $K_x$. A weight matrix 306 can be generated with a horizontal component comprising the product of $K_x*K_y*I_f$, and a vertical component comprising $O_x*O_y$, where $O_x$ is output width and $O_y$ is output height. $O_x$ can be computed as $((I_x-K_x+1)+(S_x-1))/S_x$, where $S_x$ is a horizontal subsampling location. Similarly, $O_y$ can be computed as $(I_y-K_y+1)+(S_y-1))/S_y$, where $S_y$ is a vertical subsampling location. The weight matrix 306 can then be multiplied by an output feature matrix 308 to generate a weighted output feature matrix 310.

The convolution of input features to obtain output features can be particularly useful in 2D convolution neural networks. In such networks, kernels are often called weights and are trainable parameters. Subsampling is a technique used in convolutional neural networks to reduce resolution for faster computation and better generalization, and consists of computing a convolution only at a certain location. When a neural network is deployed, the function computed by the neural network is obtained by computing the "forward propagation," whereby output is determined by multiplying an input by a weight. Operations for the forward propagation can be similar computing the output features as described with regard to FIG. 2. However, for training purposes, the gradients of the error with respect to the weights can be computed in order to update the weights (weight update), and the gradients of the error with respect to the input features can be computed in order to update previous layers (back propagation). Both of these operations can be performed on the unfolded matrix structure, as follows:

Forward propagation: output=input*weight
Weight update: weight_gradient=input$^T$*output_gradient
Back propagation: input_gradient=output_gradient*weight$^T$ Once the gradient of the input has been computed, the input can be "refolded" to be passed to the previous layer. The refolding operation can sum all the gradients of duplicated input to their location of origin. Unfolding convolutional layers can yield substantial speed increases for training and deploying neural networks. Speed increases can be compounded by using special hardware instructions in conjunction with, for instance, Intel's Math Kernel Library (MKL). On a neural network used for OCR, we have seen end-to-end speed increases of three times or more can be achieved.

Figure 4:
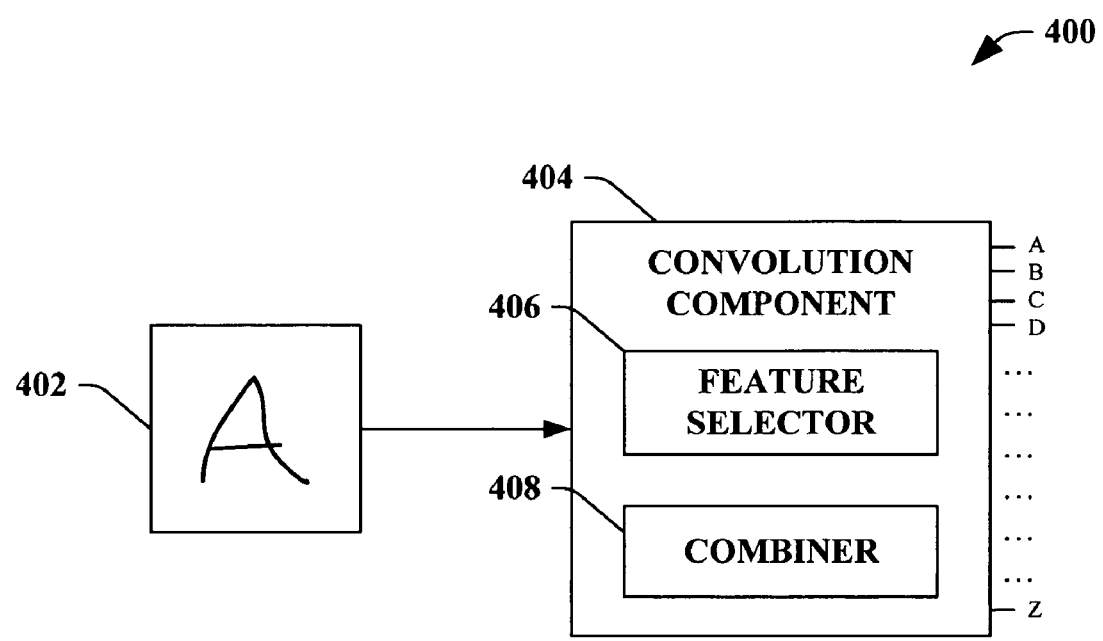
FIG. 4 illustrates a system that facilitates duplicating input data during feature extraction to reorganize data for a convolution protocol, in accordance with various aspects.

FIG. 4 illustrates a system 400 that facilitates duplicating input data during feature extraction to reorganize data for a convolution protocol, in accordance with various aspects. The system 400 comprises a convolution component 404 that receives an input 402 and performs various actions related to, for example, optical character recognition and the like. For instance, input 402 comprises a digitally handwritten letter "A." A feature selector 406 that is operatively associated with the convolution component 404 can select one or more features associated with the input 402, which can be processed by convolution component 404 in a manner similar to those described above with regard to FIGS. 1-3. For instance, input 402 can be a 29×29-pixel input, as described in greater detail with regard to FIG. 9, and feature selector 406 can select features therein while excluding edges. Convolution component 404 can then perform subsampling protocols, convolution techniques, and the like, to provide output features as detailed above.

The convolution component 404 further comprises a combiner 408 that can output, for example, a score for the feature outputs, which can be compared to scores for learned letters and/or characters, in order to facilitate making a determination as to which character is represented by the input 402. Thus, in conjunction with the matrix product convolution model detailed above, input data 402 can be linearized into a large matrix of output feature values rather than a plurality of small matrices, which can increase processing rates and decrease computational overhead.

Figure 5:
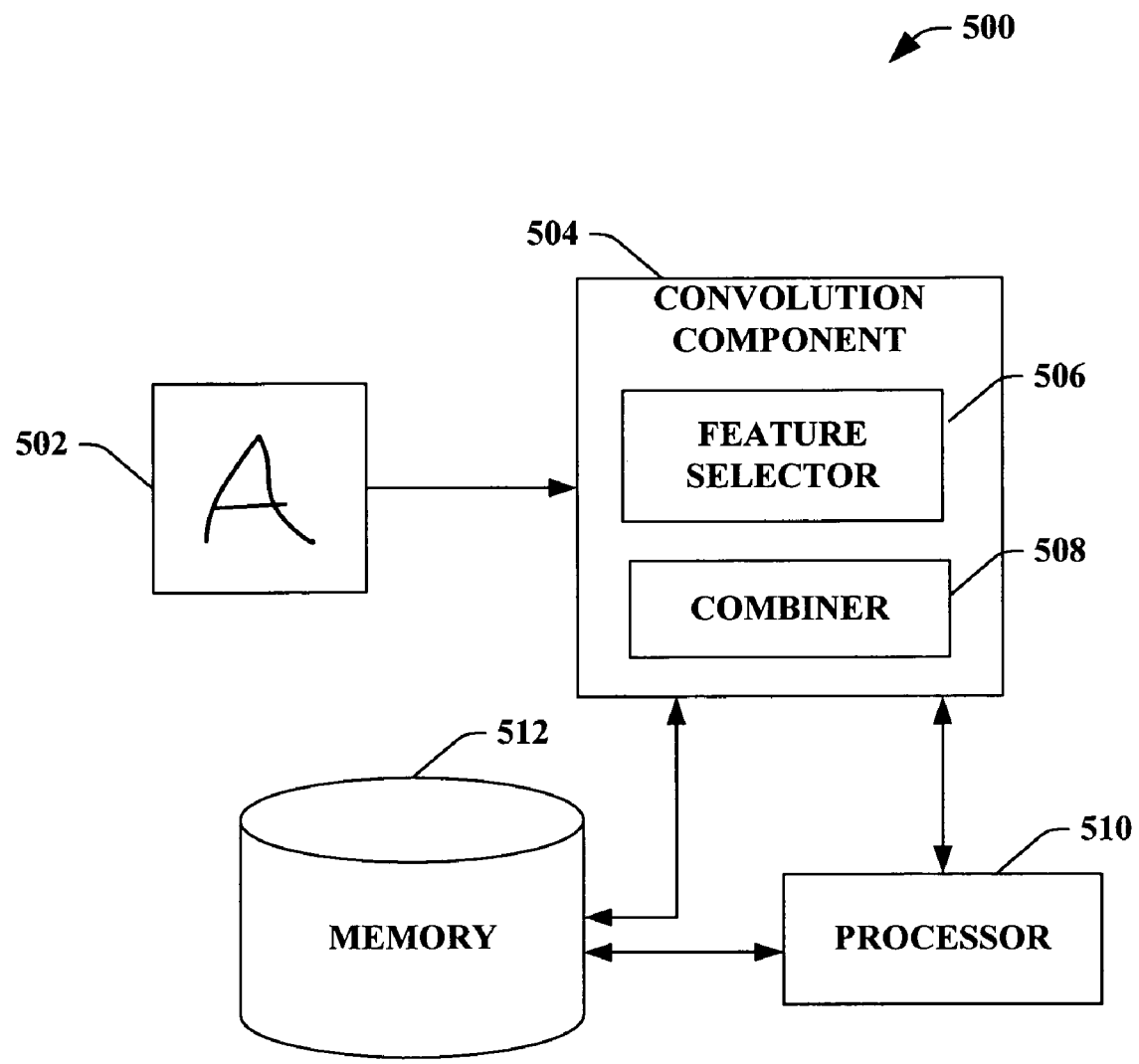
FIG. 5 is an illustration of a system that facilitates input data reorganization and/or duplication for convolution, in accordance with one or more aspects.

FIG. 5 is an illustration of a system 500 that facilitates input data reorganization and/or duplication for convolution, in accordance with one or more aspects. The system 500 comprises a convolution component 504 that receives an input 502 comprising an image and performs an unfolding convolution technique. The convolution component 504 comprises a feature selector 506 that selects multiple features from an image, across which the convolution component 504 can unfold data. Additionally, the convolution component 504 comprises a combiner 508 that can combine convolved matrix information to provide an output that is computationally less expensive to process than traditional convoluted matrix output.

Convolution component 504 is further operatively coupled to a processor 510 and a memory 512. Processor 510 can be a processor dedicated to processing input data that has been reorganized and/or duplicated by convolution component 504, a processor that controls one or more components of system 500, and/or a processor that both processes input data that has been reorganized and/or duplicated by convolution component 504 and controls one or more components of system 500.

It will be appreciated that the memory 512 can be a data store that can store various data related to the system 500. The data store can provide storage for input features, data related thereto, reorganized and/or duplicated data, convolved matrices, protocols related thereto, etc. The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data stores of the subject systems and methods are intended to comprise, without being limited to, these and any other suitable types of memory. In addition, it is to be appreciated that such data stores can be a server, a database, a hard drive, and the like.

Figure 6:
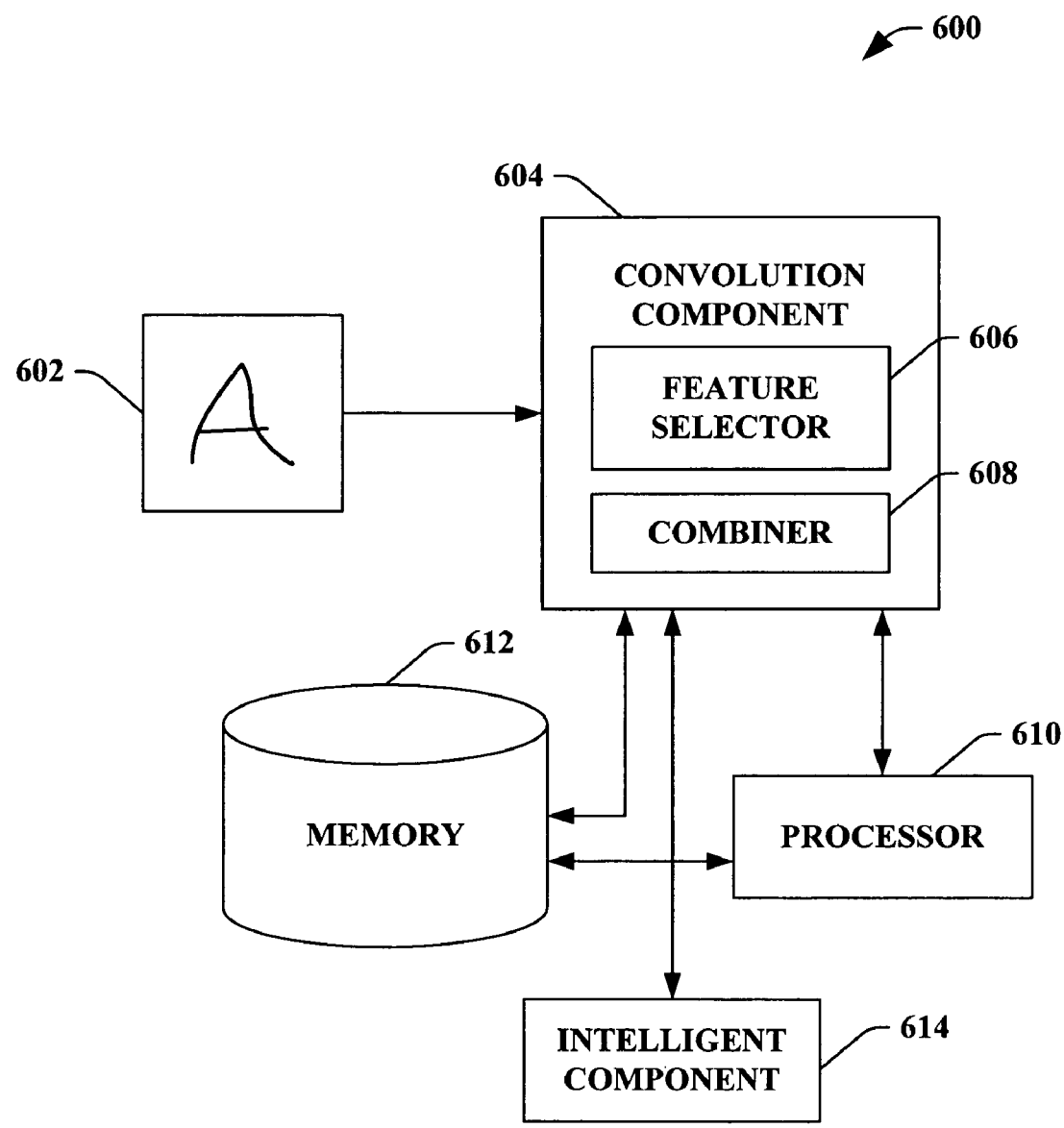
FIG. 6 is an illustration of a system that facilitates generating redundant copies of input information to reorganize the input for a convolution technique to reduce computational overhead associated therewith and increase processing speed, in accordance with one or more aspects.

FIG. 6 is an illustration of a system 600 that facilitates generating redundant copies of input information to reorganize the input for a convolution technique to reduce computational overhead associated therewith and increase processing speed, in accordance with one or more aspects. An input 602 related to, for example, an image to be processed, can be received by a convolution component 604. Convolution component 604 can comprise a feature selector 606 and a combiner, as described with regard to previous figures, and can reorganize the input data 602 (e.g., and/or duplicate input data) to facilitate generating a large output matrix that is more economical to process than are several smaller output matrices, as described with regard to FIGS. 2 and 3. Furthermore, convolution component 604 is operatively associated with a processor 610 and a memory 612, each of which is coupled to the other, as described with regard to FIG. 5.

An intelligent component 614 is coupled to convolution component 604, and can make inferences regarding optimization of system performance and the like. The intelligent component 614 can be utilized by the convolution component to infer an appropriate subsampling rate, an appropriate convolution matrix size, input data to be duplicated and/or realigned, etc. According to one example, intelligent component can infer that multiple input features to be processed are better processed using a matrix product technique to generate a larger output matrix than would be generated using a conventional convolution technique. In such a case, the larger output matrix can be more efficiently processed than can several smaller matrices. It will be appreciated that the forgoing is illustrative in nature and is not intended to limit the scope inferences that can be made by intelligent component 614 or the manner in which intelligent component 614 makes such inferences.

It is to be understood that the intelligent component 614 can facilitate reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. Such classification schemes can be utilized by the subject systems and/or methods to facilitate inferring states and/or actions related to data reorganization, feature convolution, optical character recognition, etc.

Figure 7:
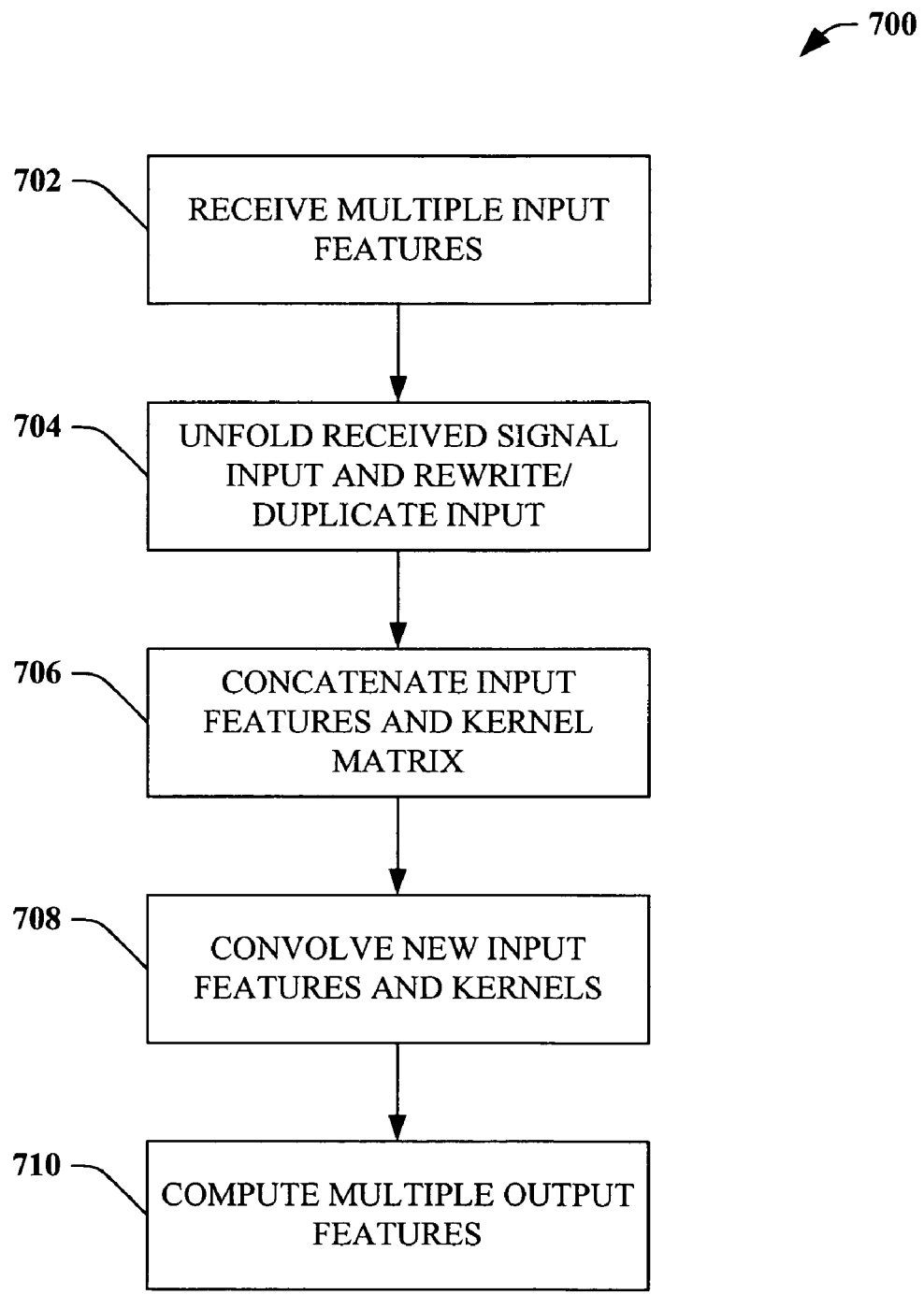
FIG. 7 is an illustration of a method for unfolding an input signal comprising multiple input features for convolution into a single output matrix that is computationally less expensive to process than several smaller output matrices, in accordance with various aspects.
Figure 8:
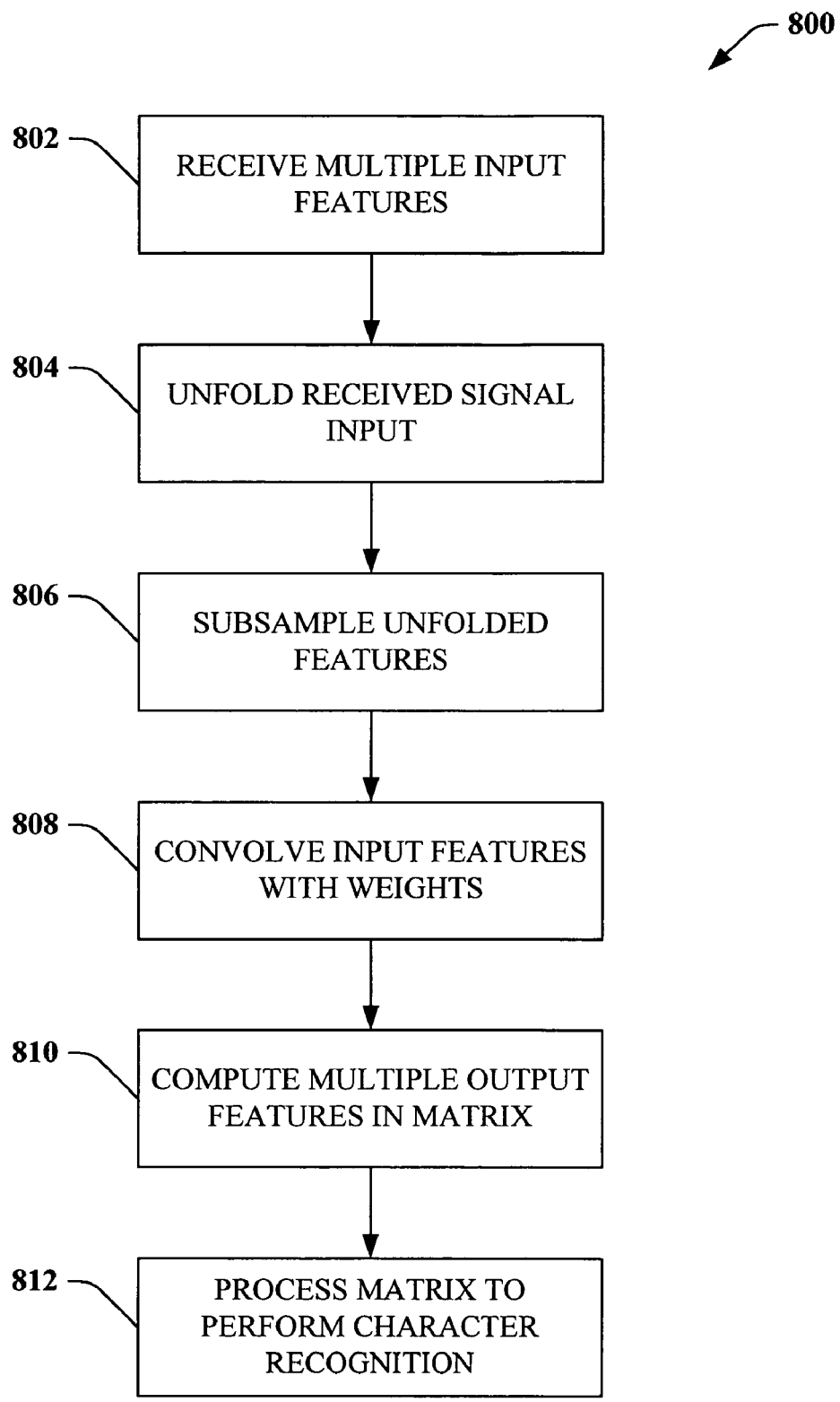
FIG. 8 illustrates a methodology for reorganizing input data to resolve irregularity and improve processing speed in a convolutional network, in accordance with one or more aspects described herein.

FIGS. 7-8 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 7 is an illustration of a method 700 for unfolding an input signal comprising multiple input features for convolution into a single output matrix that is computationally less expensive to process than several smaller output matrices, in accordance with various aspects. At 702, multiple input features can be received in an input signal. Such features can be associated, which, for example, an input image, such as a scanned document, a digitally handwritten document, or the like. At 704, the received signal input can be unfolded, as described above with regard to FIGS. 2 and 3. Also, as described above, input can be rearranged/rewritten and/or duplicated. Input features can then be concatenated at 706, for example into a long(er) row of the input matrix. Similarly, a kernel matrix can be concatenated at 706 by concatenating into columns the kernels associated with respective output features, such that each output feature corresponds to a column in the kernel matrix.

At 708, a convolution procedure can be performed to multiply the rearranged input matrix by the kernel matrix, which can result in computation of multiple output features at 710. In this manner, received input features can be reorganized into a matrix format that is more processor-friendly (e.g., linearized to accommodate processing protocols employed by processors that utilize linear memory access schemes) in order to generate a single large matrix that is computationally less-expensive to process than several smaller output feature matrices.

FIG. 8 illustrates a methodology 800 for reorganizing input data to resolve irregularity and improve processing speed in a convolutional network, in accordance with one or more aspects described herein. At 802, multiple input features can be received in an input signal. Features in the received input signal can be unfolded (e.g. duplicated, reorganized, . . . ) at 804 into a revised input matrix. Such unfolded features can be subsampled at 806 to generate a plurality of reduced, or concatenated, matrices.

At 808, the revised input feature matrices can be convolved with a plurality of weights, or kernels, generated from the input features, in order to generate an output feature matrix at 810. It will be appreciated that the various actions related to concatenation, data duplication, convolution, and the like, can be performed as described above with regard to FIGS. 2 and 3. For instance, convolution can comprise performing actions such as are described with regard to the matrix product model set forth in FIG. 2, the unfolding procedures set forth with regard to FIG. 3, etc.

At 812, the output matrix can be processed to at a speed greater than can be achieved using conventional convolution approaches, due to the single, larger output matrix of output features as compared to an output of several smaller output matrices, and the rearranged 2D matrix can be employed to facilitate character recognition. In this manner, computational overhead associated with processing numerous small matrices can be reduced by rearranging and/or aggregating input feature data prior to convolution, which in turn facilitates reducing processing speed and thus training time required to train a neural network for character recognition.

Figure 9:
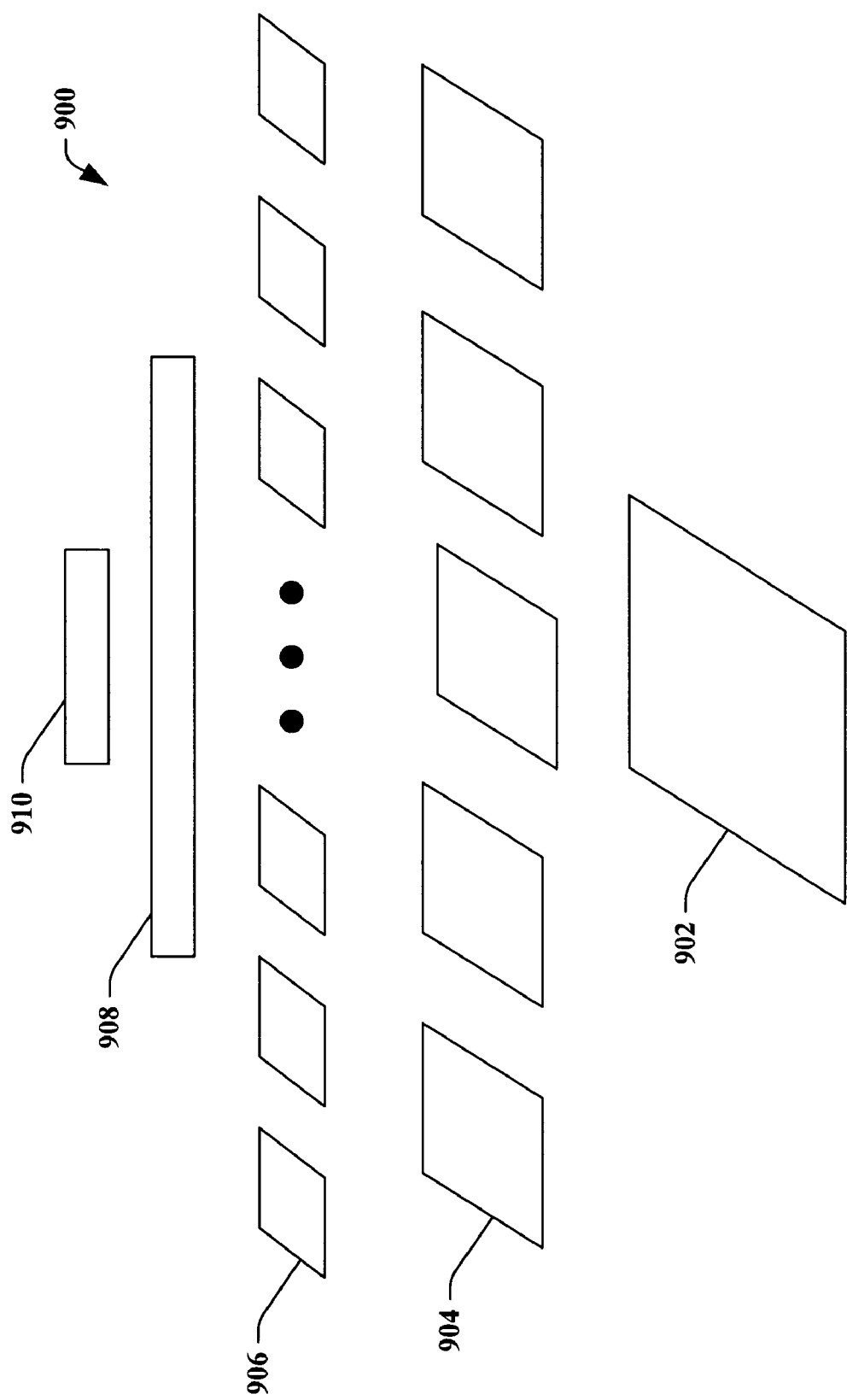
FIG. 9 illustrates an exemplary system that can receive input data for convolution in connection with various aspects.

Turning now to FIG. 9, an exemplary system 900 that can receive input data for convolution in connection with various aspects is illustrated. In accordance with one aspect, the system 900 can be a convolutional neural network. However, it is to be understood that Bayesian belief networks, support vector machines, variational methods, boosting algorithms, and other similar learning algorithms and/or systems can be employed as systems that can recognize and/or analyze labeled data. The system 900 can be structured according to input data, and for exemplary purposes the system 900 is structured to receive training data from the MNIST dataset and further recognize and/or analyze data from such dataset. MNIST is a benchmark dataset of images of segmented handwritten digits, each with 28×28 pixels.

The architecture of the system 900 enables extraction of simple features at a higher resolution that can thereafter be converted into more complex features at a coarser resolution. In accordance with an aspect, sub-sampling a layer by a factor of two achieves such generation of coarser resolution. This, in turn, is a clue to desirable size of a kernel of the system 900, which for exemplary purposes is illustrated at five layers. The input layer 902 of the system 900 is 29×29, as the initial MNIST input size is 28×28, and 29×29 is the nearest value that can generate an integer size after two layers of convolution.

Convolution layers 904 and 906 can be utilized to extract particular feature(s) delivered from the input layer 802 that can be employed in training the system 900. For example, convolution layer 904 can facilitate extraction of five 13×13 features from the input of one 29×29 feature. Such convolution layer 904 extracts very simple features, which after training of the system 900 appear similar to edge, ink, or intersection detectors. Moreover, the system 900 can extract more or less than five features, as such convolution layer 904 is merely exemplary. Convolution layer 806 can thereafter extract more particular features from the five 13×13 features into fifty 5×5 features. When viewed together, the convolution layers 804 and 806 can be categorized as a trainable feature extractor.

Layers 908 and 910 can be viewed as a classifier that is trained via features extracted by the convolution layers 904 and 906. The layers 908 and 910 are two fully connected layers, thereby together creating a universal classifier. A number of hidden units (not shown) can be associated with the layers 908 and 910, thereby facilitating optimal classification. The number of hidden layers is variable, wherein the number chosen controls capacity and generalization of the system 900. For example, as MNIST comprises ten classes, 100 hidden units is appropriate.

In accordance with another aspect, for sake of simplicity cross-entropy (CE) and mean squared error (MSE) are two disparate error functions that can be utilized while training such a neural network. Other training strategies, such as momentum, weight decay, structure-dependent learning rates, padding inputs, averaging rather than sub-sampling, etc. can be employed.

The system 900 can be tested modularly via utilizing back-propagation techniques. For example, an assumption can be made that a module M has a forward propagation function that computes an output M(I,W) as a function of input I and parameters W. The module M must also then have a backward propagation function (with respect to the input I) that computes an input gradient as a function of an output gradient, as well as a gradient function (with respect to a weight) that can compute a weight gradient with respect to the output gradient, and a weight update function that adds the weight gradients to the weights via utilizing update rules such as batch, stochastic, momentum, weight decay, etc.

The Jacobian matrix of the module M is $$J_{ki} \equiv \frac{\partial M_k}{\partial x_i}.$$

Utilizing the backward propagation function and the gradient function, the Jacobian matrices $$\frac{\partial I}{\partial M(I, W)} \text{ and } \frac{\partial W}{\partial M(I, W)}$$

can be computed via feeding (gradient) unit vectors $\Delta M_k$ (I,W) to the backward propagation function and the gradient function, where k indexes all output units of M, and only unit k is set to one while all others are set to 0. Conversely, arbitrarily accurate estimates of the Jacobian matrices $$\frac{\partial M(I, W)}{\partial I} \text{ and } \frac{\partial M(I, W)}{\partial W}$$

can be achieved by adding small variations $\epsilon$ to I and W and calling the M(I,W) function. A determination can be made that the forward propagation accurately corresponds to the backward and gradient propagation via utilizing the equalities $$\frac{\partial I}{\partial M} = F\left(\frac{\partial M}{\partial I}\right)^T \text{ and } \frac{\partial W}{\partial M} = F\left(\frac{\partial M}{\partial W}\right)^T,$$

where F is a function that inverts each element of a selected matrix. It is noteworthy that the backward propagation computes $$F\left(\frac{\partial I}{\partial M(I, W)}\right)$$

directly so that only a transposition is required to compare it with the Jacobian computed via forward propagation. In other words, if the equalities above are verified to a precision of a machine, learning is implemented correctly. Such modular debugging is particularly useful for large networks as incorrect implementations can yield reasonable results (e.g., learning algorithms can be robust even to bugs).

In one exemplary implementation, a neural network(s) utilized can be C++ module(s) that are combination(s) of more basis module(s). A module test program instantiates a module in double precision, and can select ε equal to $10^{-12}$ (a machine precision for double precision can be $10^{-16}$), can further generate random values for I and W, and perform a correctness test to a precision of $10^{-10}$. If a larger module fails such test, each submodule can be tested to determine where failures originate. Such a procedure can save a considerable amount of time otherwise utilized to debug a neural network.

Figure 10:
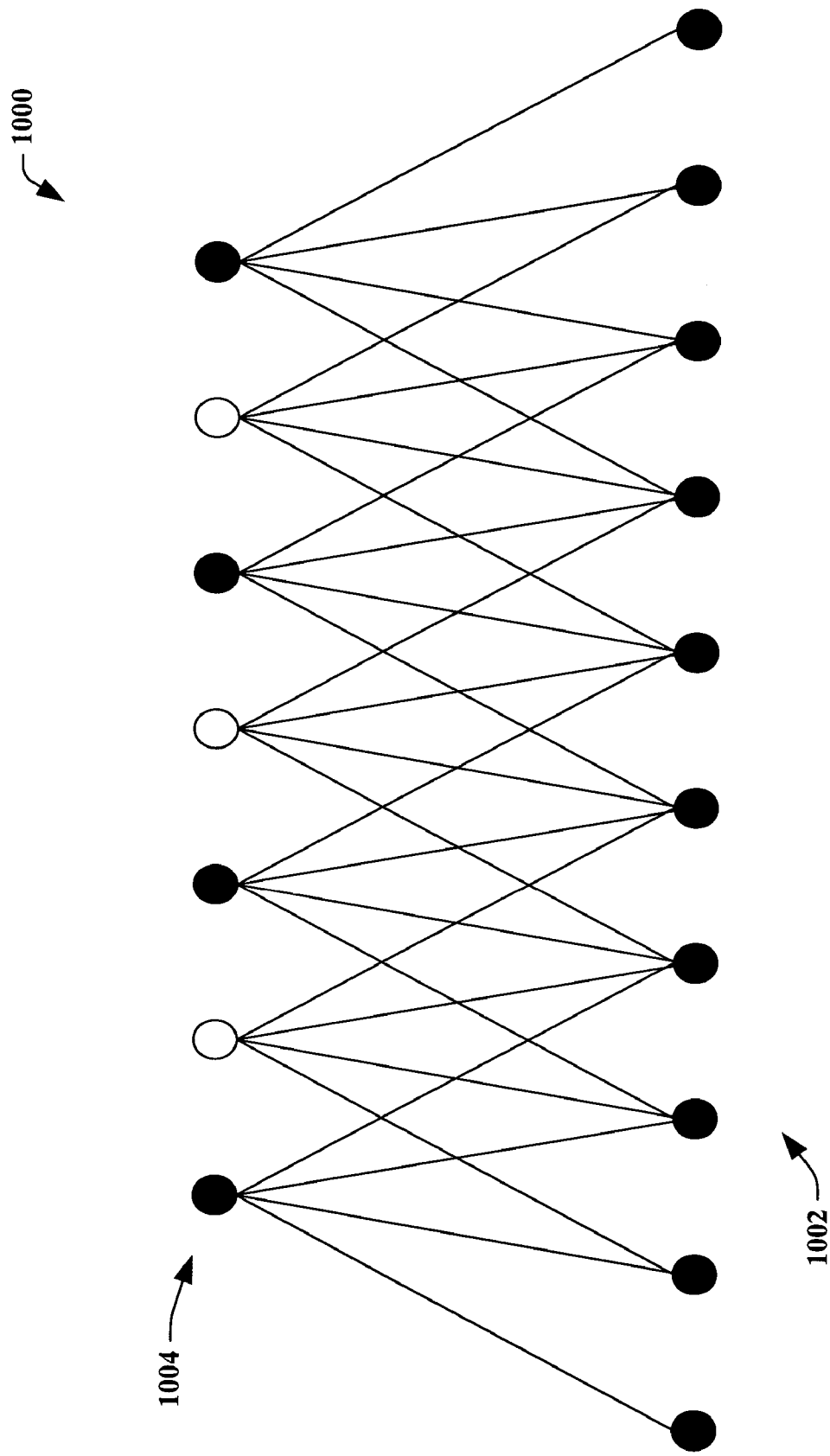
FIG. 10 illustrates an exemplary grouping of units of a neural network that can be employed as a classifier (not shown) in accordance with various aspects is illustrated.

Now referring to FIG. 10, an exemplary grouping of units 1000 of a neural network that can be employed as a classifier (not shown) in accordance with various aspects is illustrated. For instance, the neural can receive labeled training data generated via elastic distortions of an initial set of training data. Fully connected neural networks typically utilize the following rules to implement forward and backward propagation:

$$x_j^{L+1} = \sum_i w_{j,i}^{L+1} x_i^L \text{ and } g_i^L = \sum_j w_{j,i}^{L+1} g_j^{L+1}$$

where $x_i^L$ and $g_i^L$ are an activation and gradient of unit i at layer L, respectively, and $w_{j,i}^{L+1}$ is a weight connecting unit i at layer L to unit j at layer L+1. Such rules can be viewed as activation units of a higher layer "pulling" activations of all units connected to such activation units. Similarly, units of a lower layer are pulling gradients of all units connected to the units of the lower layer. Such pulling strategy, however, can be complex and difficult to implement when computing gradients of a convolutional neural network, as a number of connections leaving each unit is not constant due to border effects.

For example, all units of a layer 1002 (e.g., $g_i^0$) have a variable number of outgoing connections. In contrast, all units on a layer 1004 (e.g., $g_i^1$) have a fixed number of incoming connections. To simplify computation, rather than "pulling" a gradient from the layer 1002, a gradient from the layer 1004 can be "pushed." The resulting equation is:

$$g_{j+1}^L += w_i^{L+1} g_j^{J+1}.$$

For each unit j in the layer 1004, a fixed number of units i from the layer 1002 can be updated. As weights are shared in convolution, w does not depend upon j. In some contexts "pushing" can require more computing time than "pulling", due to gradients accumulating in memory during "pushing" as opposed to gradients accumulating in registers during "pulling." For large convolutions, however, "pushing" a gradient can be faster, and can be utilized to take advantage of particular processor's instruction sets (e.g., Intel SSE) because all memory accesses are contiguous. In regards to implementing the convolutional network, "pulling" an activation and "pushing" the gradient is a simple manner for implementation.

In an exemplary trial utilizing neural networks trained via a portion of the MNIST dataset for training the neural networks and the remainder for analyzing performance of such networks, the following results were achieved.

| Algorithm | Distortion | Error |
|---|---|---|
| 2 layer MLP (CE) | None | 1.6% |
| 2 layer MLP (CE) | affine | 1.1% |
| 2 layer MLP (MSE) | elastic | 0.9% |
| 2 layer MLP (CE) | elastic | 0.7% |

-continued

| Algorithm | Distortion | Error |
|---|---|---|
| Simple conv (CE) | affine | 0.6% |
| Simple conv (CE) | elastic | 0.4% |

Both fully connected and convolutional neural networks (e.g., system 3600) were utilized to obtain the above results, and the first 50,000 patterns of the MNIST dataset were utilized for training while the remaining 10,000 were utilized for validation and parameter adjustments. The two-layer Multi-Layer Perceptron (MLP) (e.g., system 3600) had 800 hidden units. As can be seen from data in the table above, elastically distorting training data to generate additional training data improved performance of all neural networks when compared to affine distribution. Moreover, it can be observed that convolution neural networks outperform two layer MLPs. Finally, it is to be noted that elastically distorting training data delivered to a convolutional neural network has resulted in lowest error percentage known to date.

Figure 11:
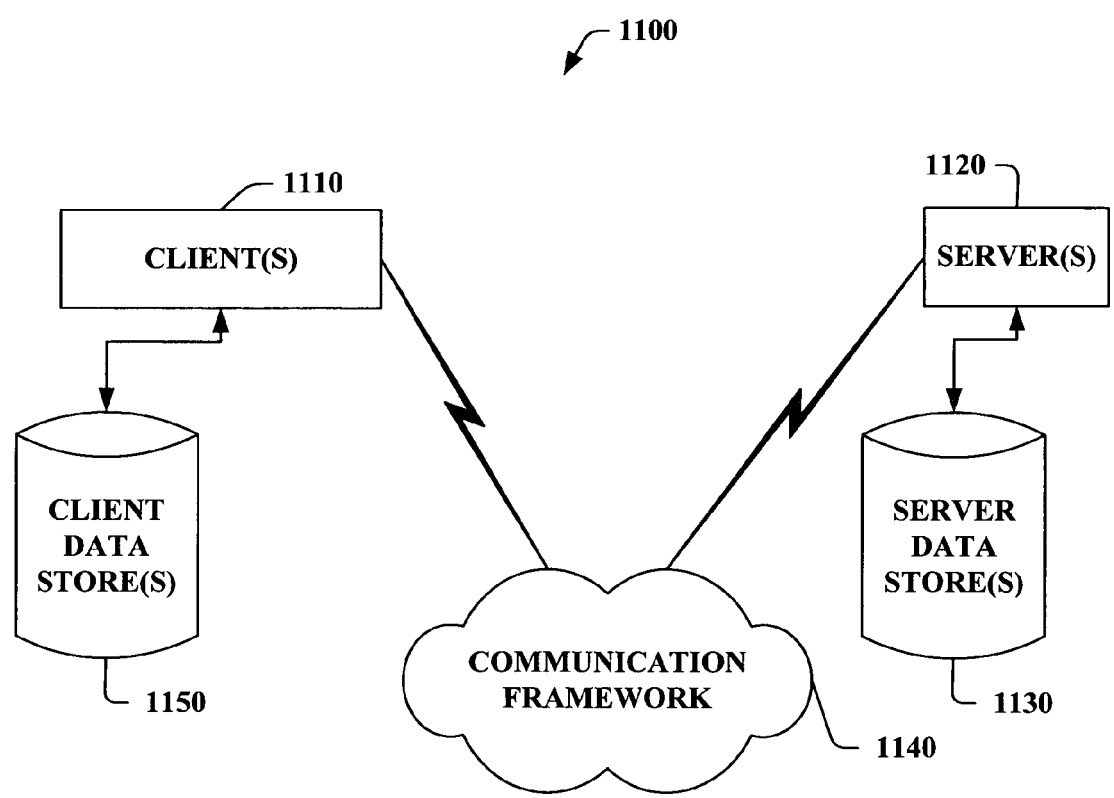
FIG. 11 illustrates an exemplary networking environment, wherein the novel aspects of the claimed subject matter can be employed.
Figure 12:
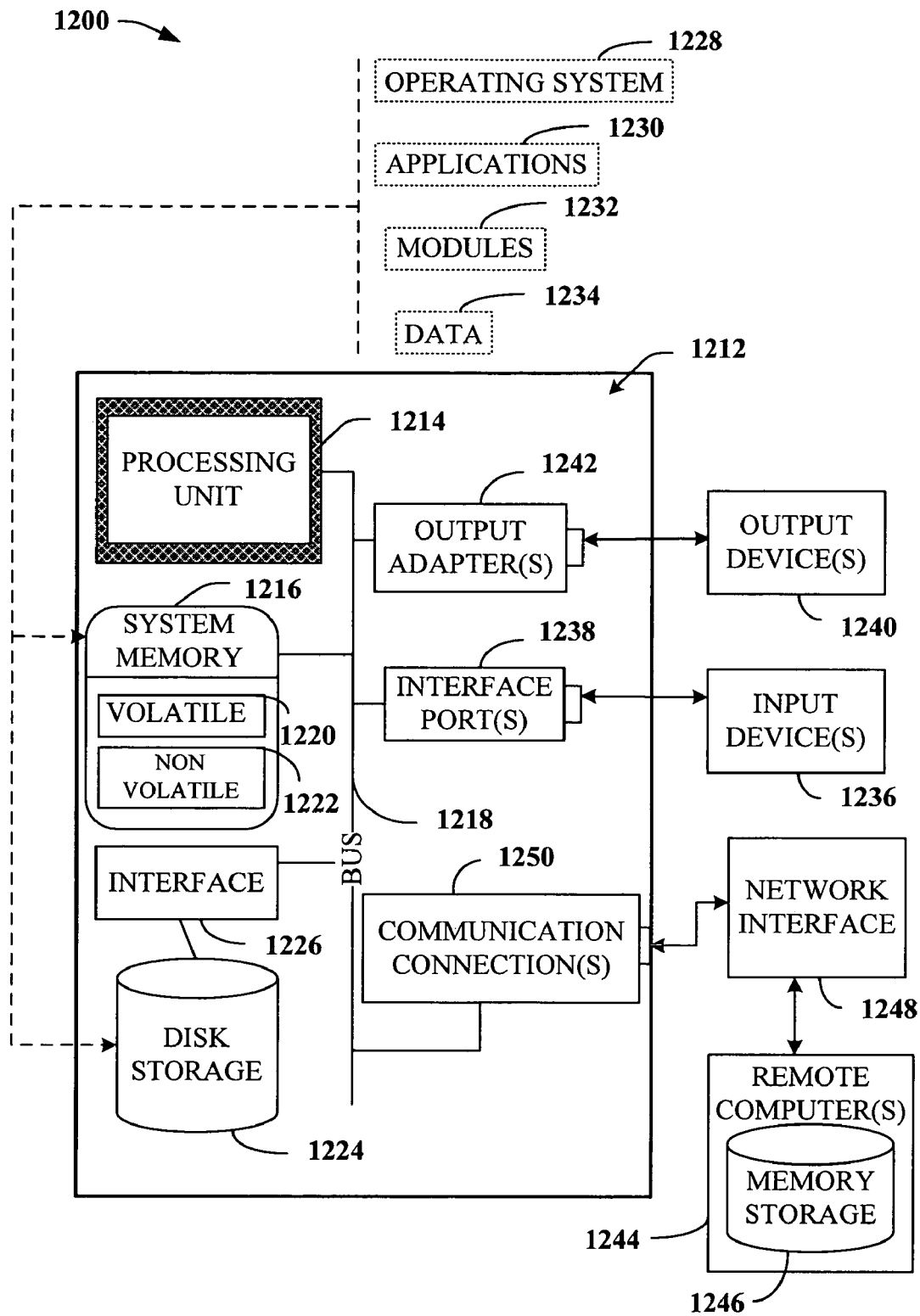
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operatively connected to one or more client data store(s) 1150 that can be employed to store information local to the client(s) 1110. Similarly, the server(s) 1120 are operatively connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented method for extracting features, comprising:
one or more processors implementing instructions stored in one or more processor-accessible storage medium for:
receiving a plurality of input features, $I_f$, from an input signal, the input features having a height, $I_y$, and a width, $I_x$;
unfolding the input features to generate linearized weights, the linearized weights having a height, $K_y$, and a width, $K_x$;
determining a horizontal subsampling location, $S_x$, and a vertical subsampling location, $S_y$;
concatenating the input features into an input matrix via a processor controllable convolution component, wherein a horizontal component of the input matrix comprises the product of $K_x*K_y*I_f$, and a vertical component of the input matrix comprises the product of $[((I_x-K_x+1)+(S_x-1))/S_x]*[(I_y-K_y+1)+(S_y-1))/S_y]$; and
multiplying the input matrix by a kernel matrix to generate a matrix product.

2. The method of claim 1, further comprising:
computing a gradients of the error of the unfolded matrix with respect to a weight; and
computing a gradients of the error of the unfolded matrix with respect to the input features.

3. The method of claim 1, wherein unfolding the input features including unfolding at least one element from each input feature into each column.

4. The method of claim 1, further comprising rewriting the input matrix so that at least one row of the input matrix comprises at least one feature required to compute one output feature.

5. The method of claim 4, rewriting the input matrix further comprises duplicating the input features in the input matrix.

6. The method of claim 1, generating the input matrix further comprises subsampling the input features.

7. The method of claim 1, at least one column in the kernel matrix represents at least one output feature.

8. The method of claim 1, further comprising generating a plurality of reduced input matrices by subsampling the unfolded input.

9. The method of claim 8, further comprising reorganizing the output features into a two-dimensional matrix consistent with an original two-dimensional layout of the input features and performing a character recognition protocol.

10. A computer-implemented system that employs a convolutional neural network to facilitate feature extraction for optical character recognition, comprising:
a processor; and
a memory into which a plurality of computer-executable instructions are loaded, the plurality of instructions performing a method comprising:
receiving a plurality of input features from an input signal, the input features having a height, $I_y$, and a width, $I_x$, wherein $I_f$ is the number of received input features;
weighting the input features to generate linearized weights, the linearized weights gleaned from the input features, the linearized weights having a height, $K_y$, and a width, $K_x$;
unfolding multiple input features;
concatenating the unfolded input features to generate an input feature matrix, wherein a horizontal component of the input matrix comprises the product $K_x*K_y*I_f$, and wherein a vertical component of the input feature matrix comprises the product of $[((I_x-K_x+1)+(S_x-1))/S_x]*[(I_y-K_y+1)+(S_y-1))/S_y]$, where $S_x$ is a horizontal subsampling location and $S_y$ is a vertical subsampling location;
generating a kernel matrix; and
computing a matrix of output features by generating a matrix product of the input feature matrix and the kernel matrix.

11. The system of claim 10, further comprising performing character recognition based at least in part on information associated with the matrix product.

12. The system of claim 10, further comprising generating multiple output features based at least in part on the matrix product.

13. The system of claim 10, wherein the processor further analyzes the matrix of out features to perform character recognition.

* * * * *

UNITED STATES PATENT AND TRADEMARK OFFICE
CERTIFICATE OF CORRECTION

PATENT NO. : 7,634,137 B2  Page 1 of 1
APPLICATION NO. : 11/250819
DATED : December 15, 2009
INVENTOR(S) : Patrice Y. Simard et al.

It is certified that error appears in the above-identified patent and that said Letters Patent is hereby corrected as shown below:

In column 6, line 4, after "e.g.," insert -- a --.

Signed and Sealed this

Fifteenth Day of February, 2011

David J. Kappos
*Director of the United States Patent and Trademark Office*